United States Patent

[11] 3,578,356

[72] Inventor Maurice Moiriat
    8490 Clark St., Montreal, Quebec, Canada
[21] Appl. No. 821,397
[22] Filed May 2, 1969
[45] Patented May 11, 1971

[54] DETACHABLE GOOSENECK
    5 Claims, 5 Drawing Figs.
[52] U.S. Cl. .................................................. 280/425
[51] Int. Cl. ................................................ B62d 53/06
[50] Field of Search .......................................... 280/423,
    423(B), 425, 425(A); 214/505, 506; 254/86, 86
    (H)

[56] References Cited
    UNITED STATES PATENTS

| | | | |
|---|---|---|---|
| 2,350,841 | 6/1944 | Troche et al. | 280/81X |
| 2,606,744 | 8/1952 | Tracey | 254/86(H) |
| 2,621,021 | 12/1952 | Dahl et al. | 254/86(H) |
| 2,851,181 | 9/1958 | Thomann | 214/506 |
| 2,822,945 | 2/1958 | Duffy | 280/423(B)X |
| 3,384,390 | 5/1968 | Moiriat et al. | 280/423(B) |

FOREIGN PATENTS
411,073 5/1934 Great Britain .................. 254/86(H)

OTHER REFERENCES
German printed application No. 1,243,028 280/425(A) Schmidt, Karl Heinz - Pulished June 22, 1967

Primary Examiner—Leo Friaglia
Attorney—Raymond A. Robic

ABSTRACT: A trailer wherein a depressed load bed is coupled at one end to a gooseneck which is mounted at the rear of a tractor. The depressed load bed comprises at least two spaced-apart and longitudinally disposed beams. A pair of hydraulic pistons are horizontally mounted underneath the load bed, either longitudinally or transversely with respect to the beams and each of the hydraulic piston are connected at each end thereof to the articulation of a toggle mechanism. The toggle mechanism is pivotally connected at one end thereof to one of the beams and at the other end thereof to a ground-engaging footplate. The hydraulic pistons are dimensioned to fit within an enclosure defined by the upper and lower surfaces of the beams and are movable from a retracted position within said enclosure to an extended position whereby the end of the trailer may be uncoupled from the gooseneck and lowered to any desired position.

INVENTOR
Maurice MOIRIAT
BY
ATTORNEY

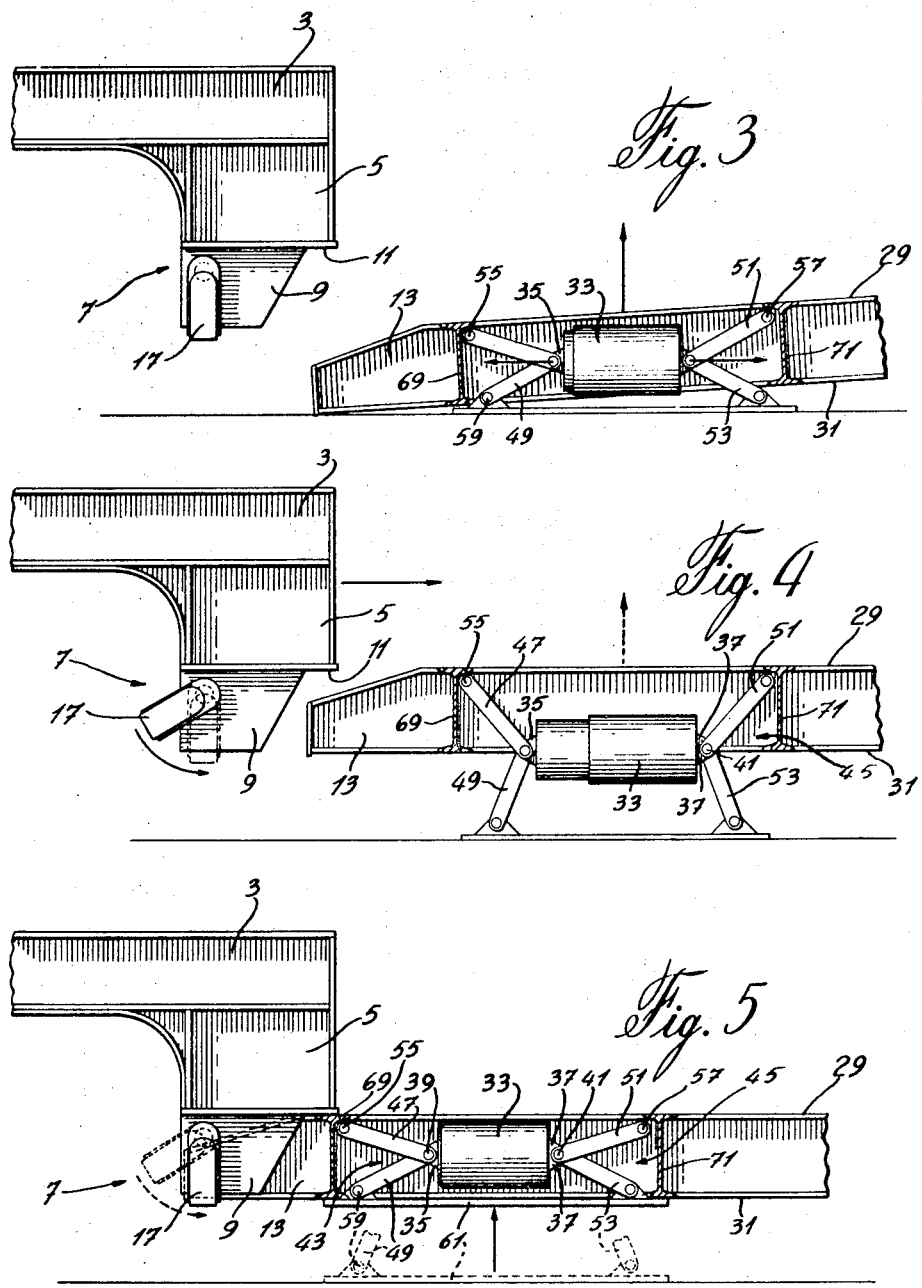

DETACHABLE GOOSENECK

This invention relates to a detachable gooseneck. More particularly, the invention is concerned wit a trailer detachably coupled to a gooseneck in which the jack is mounted under the load bed rather than on the gooseneck.

Formerly known detachable gooseneck trailers usually present a narrow load supporting bed which is made of two or more spaced-apart and longitudinally disposed beams over which the equipment is caused to rest on its underframe with the tracks or wheels thereof freely projecting on either side of the trailer. A jack is mounted underneath the gooseneck for supporting it when the tractor is disconnected therefrom. For loading the trailer with heavy equipment, the trailer is uncoupled from the detachable gooseneck and its free end takes bearing on the ground during loading and unloading. The above arrangement is quite inconvenient since there is always the necessity of resorting to cumbersome means to lower down the free end of the trailer and thereafter to return it to an engaging position with respect to the gooseneck. Since in this kind of equipment the load bed is very close to the ground, it has been found impossible to provide the free end thereof with a common jack in order to hydraulically lower it down to any desired position or to return it to an engaging position with respect to the gooseneck.

It has been found that the above disadvantages may be overcome by providing a trailer having a depressed load bed coupled at one end thereof to a gooseneck mounted at the rear of a tractor, said depressed load bed comprising at least two spaced-apart and longitudinally disposed beams, with at least one hydraulic piston horizontally disposed underneath said load bed. The hydraulic piston is movable from a retracted position to an extended position to operate a ground-engaging means whereby the end of the trailer may be uncoupled from the gooseneck and lowered to any desired position.

In the drawings which illustrate embodiments according to the invention:

FIG. 3 is a side view, along with the gooseneck, of the free end of the trailer in a precoupling position;

FIG. 4 is a side view, along with the gooseneck, of the free end of the trailer in a coupling position; and FIG. 5 is a side view, along with the gooseneck, of the free end of the trailer in a locking position.

Figures 1, 2:
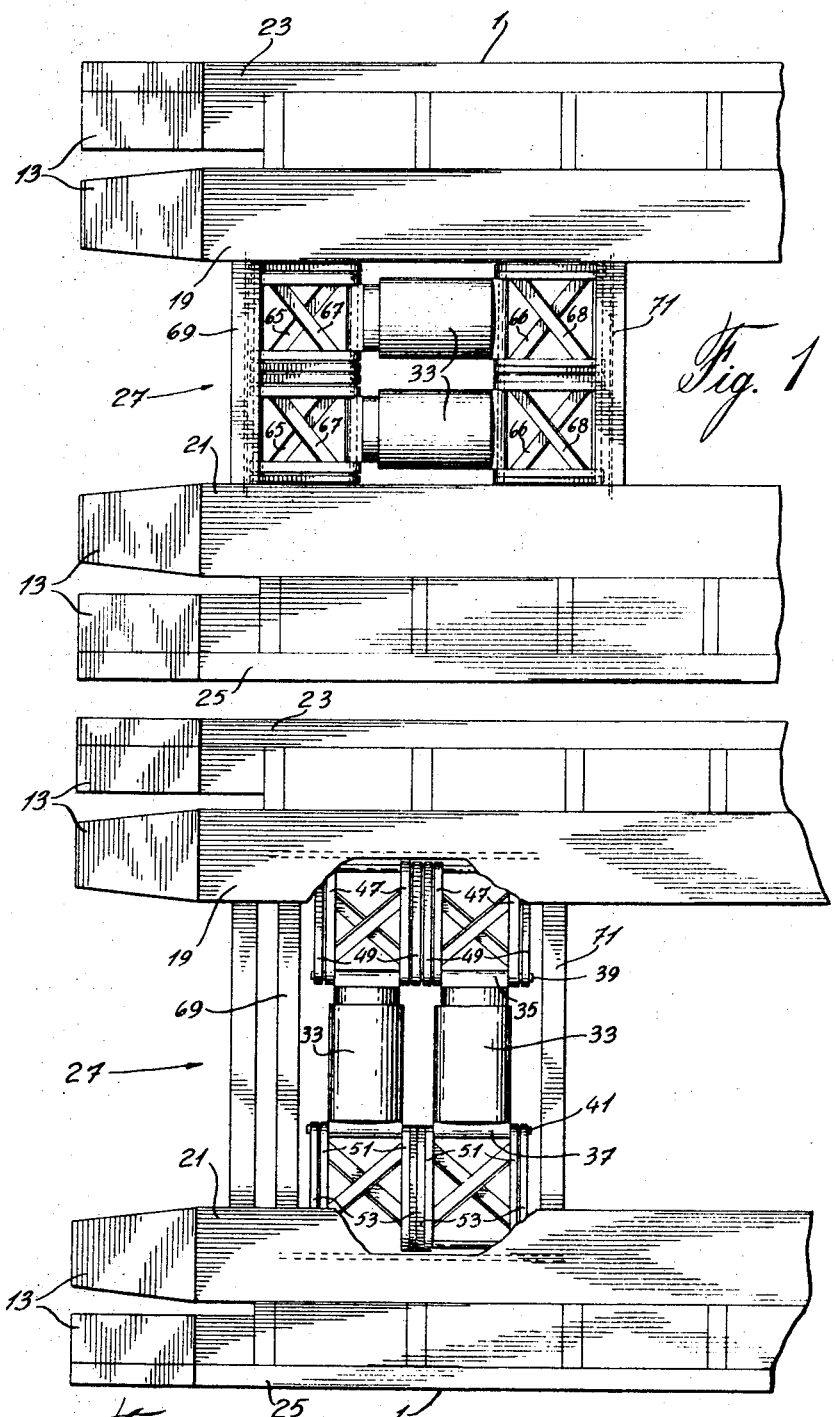
FIG. 1 is a top plan view of one embodiment according to the invention.
FIG. 2 is a top plan view of yet another embodiment according to the invention.

Referring to the drawings, it will be seen that the free end of the conventional heavy-duty low center of gravity trailer 1 according to the invention is adapted to be mounted on a tractor not shown having the usual hitch member 3 provided at the rear end thereof with a gooseneck 5. The trailer 1 is hooked on the gooseneck 5 through any suitable coupling means 7. The gooseneck 5 has a series of cheek plates 9 (one only being illustrated in the drawings in FIGS. 3, 4 and 5) depending from the lower surface 11 thereof and defining therebetween a series of channels adapted to receive therein projections 13 longitudinally extending from the main body of the trailer 1. Referring to FIGS. 3, 4 and 5, it is illustrated that the free end of the trailer 1 is coupled to the gooseneck 5 and locked therein by means of the stirrup member 17. The trailer 1, at the free end thereof, comprises a pair of longitudinally spaced-apart beams 19 and 21, one on each side of the trailer 1. Each of said beams is joined along its length to the side edges 23 and 25 respectively of the trailer. The jack mechanism 27 according to the invention is mounted between the two beams 19 and 21 either longitudinally with respect to the trailer 1 as illustrated in FIG. 1 or transversely thereof as shown in FIG. 2. It should be pointed out, and this is an essential characteristic according to the invention, that the jack mechanism 27 is so dimensioned as to be confined in the retracted position (FIG. 5) within an enclosure defined by the upper surface 29 and the lower surface 31 of the beams 19 and 21.

The jack mechanism 27 comprises a hydraulic piston 33 pivotally connected at both ends 35 and 37 thereof to the articulations 39 and 41 of toggle mechanisms 43 and 45. Each toggle mechanism comprises a pair of arms 47, 49 and 51, 53 respectively. 47 and 51 are the upper arms; 49 and 53 are the lower arms. It should be pointed out at this time, as illustrated in FIGS. 1 and 2, that the hydraulic piston comprises two toggle mechanisms 43 and two toggle mechanisms 45. The upper arms 47 of the toggle mechanisms 43 are pivoted about a rod 55 mounted on the upper portion between the two beams 19 and 21 (FIG. 1). Similarly, the upper arms 51 are pivoted about another rod 57 also mounted on the upper portion between the two beams 19 and 21. The lower arms 49 of toggle mechanisms 43 are pivoted at 59 at one end of a ground-engaging footplate 61, while the lower arms 53 are pivoted at 63 at the other end of the said ground-engaging footplate 61. The upper arms 47 and 51 are connected together by means of the diagonal reinforcing braces 65 and 66, and the lower arms 49 and 53 are connected together by means of the diagonal reinforcing braces 67 and 68. It should be observed that the jack mechanism 27 whether it be mounted longitudinally or transversely with respect to the longitudinally spaced-apart beams 19 and 21, are enclosed within a frame defined by the said two beams 19 and 21 and two transverse I-beams 69 and 71.

When the jack mechanism 27 is mounted transversely of said beams 19 and 21, the rods 55 and 57 are of course mounted between the two transverse I-beams 69 and 71 (FIG. 2).

The operation of the device according to the invention is as follows. Once the free end of the trailer 1 has been set to bear on the ground, as illustrated in FIG. 3, the hydraulic piston 33 of the jack mechanism 27 has adopted a position which is close to the retracted position with the exception that the piston is slightly extended in order that the ground-engaging footplate 61 rests firmly on the ground. The heavy equipment is mounted on the trailer by the usual procedure and the trailer 1 in the precoupling position illustrated in FIG. 3 is then ready to be coupled to the gooseneck 5. To carry out that particular operation, the hydraulic piston 33 is extended to a coupling position as illustrated in FIG. 4 and the tractor is backed up toward the trailer 1 until the gooseneck 5 and the trailer are coupled together by means of coupling means 7. The free end of the trailer 1 is then locked therein by means of stirrup member 17. The unloading operation includes the above steps in reverse and may be carried out as easily as the loading operation.

It is obvious that the trailer 1 may be coupled to a gooseneck at the front and to another gooseneck at the rear end thereof.

I claim:

1. In a trailer having a depressed load bed coupled at one end thereof to a gooseneck mounted at the rear of a tractor, said depressed load bed comprising at least two spaced-apart and longitudinally disposed beams, a device for uncoupling said one end of said trailer from said gooseneck comprising two I-beams transversely and spacedly mounted between said longitudinally disposed beams to define an enclosure underneath said load bed, a pair of hydraulic pistons disposed horizontally in parallel relationship underneath said bed and dimensioned to be enclosed by said enclosure, a pair of first rods mounted in parallel relationship inside said enclosure at opposite ends thereof transversely with respect to the axes of said hydraulic pistons, a pair of spacedly mounted toggle mechanisms for each end of each hydraulic piston, each toggle mechanism formed with an upper arm and a lower arm, said upper arm articulated at the lower end thereof to the upper end of said lower arm to define an articulation of said toggle mechanism, said articulation articulately connected at the corresponding end of a corresponding hydraulic piston, the upper end of said upper arm pivotally connected to a respective rod, a vertically movable ground-engaging plate pivotally connected at opposite ends thereof to the lower ends of said lower arms, reinforcing braces between the upper arms and reinforcing braces between the lower arms of each pair of toggle mechanisms, said hydraulic piston movable from a retracted position inside said enclosure to a lower extended position whereby said ground-engaging plate engages the ground, said end of said trailer can then be uncoupled from said gooseneck and be lowered to any desired position.

2. In a trailer as defined in claim 1, wherein said hydraulic pistons are mounted transversely of said beams.

3. In a trailer as defined in claim 1, wherein said hydraulic pistons are mounted longitudinally with respect to said beams.

4. In a trailer as defined in claim 1, which comprises a second gooseneck to mount the rear of said depressed load bed, so that said depressed load bed is mounted between two goosenecks.

5. In a trailer as defined in claim 1, which comprises a pair of second pair of rods, each connecting the corresponding ends of said hydraulic pistons, said articulations of said toggle mechanisms articulately connected to said rods.